United States Patent
Nicholas et al.

(10) Patent No.: US 7,066,651 B2
(45) Date of Patent: Jun. 27, 2006

(54) DISC SPRING CENTERING DEVICE FOR SQUEEZE FILM DAMPERS

(75) Inventors: John C. Nicholas, Wellsville, NY (US); James M. Byrne, Wellsville, NY (US); Donald H. Rockefeller, Little Genesee, NY (US); Malcolm E. Leader, Dickinson, TX (US)

(73) Assignee: Rotating Machinery Technology Inc, Wellsville, NY (US)

( * ) Notice: Subject to any disclaimer, the term of this patent is extended or adjusted under 35 U.S.C. 154(b) by 33 days.

(21) Appl. No.: 10/888,363

(22) Filed: Jul. 9, 2004

(65) Prior Publication Data

US 2006/0008188 A1    Jan. 12, 2006

(51) Int. Cl.
*F16C 17/03* (2006.01)

(52) U.S. Cl. .................................................. 384/99

(58) Field of Classification Search ................. 384/99, 384/117, 309, 312, 311
See application file for complete search history.

(56) References Cited

U.S. PATENT DOCUMENTS

| | | | |
|---|---|---|---|
| 3,620,581 A | 11/1971 | Heller et al. | |
| 3,744,858 A | 7/1973 | Weichsel | |
| 4,214,796 A | 7/1980 | Monzel et al. | |
| 4,802,774 A | 2/1989 | Pesikov | 384/12 |
| 5,044,781 A | 9/1991 | Werner | 384/99 |
| 5,215,384 A | 6/1993 | Maier | 384/99 |
| 5,316,391 A | 5/1994 | Monzel | 384/99 |
| 5,613,781 A | 3/1997 | Kuzdzal et al. | 384/99 |

*Primary Examiner*—Lenard A. Footland
(74) *Attorney, Agent, or Firm*—St. Onge Steward Johnston & Reens LLC

(57) ABSTRACT

A damper film bearing assembly for supporting a rotatable shaft includes a bearing housing having a longitudinal opening passing therethrough for receiving the rotatable shaft. The bearing housing also has at least one radial recess formed in an outer surface thereof, the recess having a floor. The assembly further includes at least one support piston slideably disposed within the recess in the bearing housing, the support piston slideable within the recess radially toward and away from a central longitudinal axis of the rotatable shaft. At least one resilient element is disposed within the recess in the bearing housing between the floor of the recess and the support piston, the resilient element biasing the support piston away from the axis of the rotatable shaft.

25 Claims, 7 Drawing Sheets

DISC SPRING CENTERING DEVICE FOR SQUEEZE FILM DAMPERS

FIELD OF THE INVENTION

The present invention relates generally to bearings of the type which are typically used in connection with high speed rotating shafts, and more specifically to such bearings which incorporate squeeze film damper bearing support systems for attenuating vibrations within the bearings.

BACKGROUND OF THE INVENTION

Squeeze film dampers have been used for years to add damping to rotor-bearing systems for vibration attenuation. In such systems, a thin oil film between the journal bearing housing and the bearing case provides damping by allowing the bearing housing to bounce around in the bearing case or adapter ring (hereinafter collectively referred to as "bearing case") within the oil film. The squeeze effect on the oil produces the damping.

One challenging aspect of squeeze film damper design concerns centering the bearing housing in the bearing case. Elastomer O-rings are often used for this purpose. O-ring grooves provided in the bearing housing are offset so that the housing is high in the bearing case. When the rotor is set in the bearing, the rotor gravity load forces the bearing housing down in the bearing case. If the system is designed correctly, the bearing housing ends up being centered in the bearing case with the rotor installed.

There are numerous problems associated with using O-rings in this manner. One such problem relates to the fact that the stiffness of the O-rings is highly nonlinear, making it difficult to chose the proper diameter and thus stiffness for bearing housing centering. Another problem is that the O-rings deteriorate over time, losing their stiffness thereby allowing the bearing housing to drop down in the bearing case, reducing the effectiveness of the damper. A further problem is that, particularly for rotors that weigh over 3,000 pounds, it is difficult to find an o-ring that will provide sufficient stiffness to counteract large rotor weight.

In order to address these problems associated with using o-rings for centering the bearing housing in the bearing case, mechanical centering devices have been developed. One traditional example of such a mechanical device employs one or more arc springs for centering. However, such systems are disadvantaged in that designing the arc spring(s) resulting in appropriate properties for the each particular bearing configuration is difficult and labor-intensive.

U.S. Pat. No. 5,613,781 to Kuzdzal attempts to address these problems. The Kuzdzal patent discloses a damper film bearing assembly for supporting a rotatable shaft within an annular cavity formed in a housing. A fluid film damper mechanism acts between the annular outer surface of a bearing member and the outer wall of the cavity for damping radial movement of the bearing member within the cavity. A resiliently adjustable dead weight spring support system acts between the housing and the bearing member to support the dead weight of the shaft within a vertically centered position within the central bore so that the fluid film damper mechanism functions to maintain the shaft centered within the bore when vibrations occur during rotation of the shaft. The spring support system includes a bolt which engages the bearing member, which bolt is biased away from the bearing member by a support spring (i.e., plurality of Belleville washers) in order to provide an upwardly directed force to counterbalance the weight of the shaft and the bearing and thereby resiliently urge the bearing member and the shaft upwardly into a centered position within the central bore.

While the device disclosed in the Kuzdzal patent may obviate some of the problems associated with the earlier prior art, it still suffers from a number of disadvantages of its own. The Kuzdzal device is cumbersome and requires machining modifications to the bearing case. The bearing case is a difficult piece to machine as it is large, heavy, cumbersome and difficult to remove from the machine. For a retrofit, customers are reluctant to make a change that requires bearing case modifications. For the original equipment manufacture with a new machine, any changes to the bearing case would require deviation to a standard part, issuing new drawings and additional time and thus money spent on machining. Customers are often reluctant to do this.

Another disadvantage of the Kuzdzal device is that it would need to be assembled with the bearing case to set and check the pre-load of (i.e., the proper tightening of) the disc spring bolt and thus the proper compression of the disc springs to properly support the rotor. A further disadvantage of the Kuzdzal device is that in order to remove the bearing from the bearing case, it is necessary to disengage the disc spring bolts. As such, the pre-load must be re-set upon re-assembly, which is time and labor intensive.

What is desired, therefore, is a centering device for squeeze film dampers which is relatively easy, and not labor intensive, to design and adapt to the configurations of particular bearings, which is not prone to losing its effectiveness over time, which provides sufficient stiffness to counteract large rotor weight, which is not cumbersome and does not require machining modifications to the bearing case, and which does not require that the pre-load be set upon assembly and re-set upon each re-assembly.

SUMMARY OF THE INVENTION

Accordingly, it is an object of the present invention to provide a centering device for squeeze film dampers which is relatively easy, and not labor intensive, to design and adapt to the configurations of particular bearings.

Another object of the present invention is to provide a centering device for squeeze film dampers having the above characteristics and which is not prone to losing its effectiveness over time.

A further object of the present invention is to provide a centering device for squeeze film dampers having the above characteristics and which provides sufficient stiffness to counteract large rotor weight.

Still another object of the present invention is to provide a centering device for squeeze film dampers having the above characteristics and which is not cumbersome and does not require machining modifications to the bearing case.

Yet a further object of the present invention is to provide a centering device for squeeze film dampers having the above characteristics and which does not require that the pre-load be set upon assembly and re-set upon each re-assembly.

These and other objects of the present invention are achieved in accordance with one embodiment of the present invention by provision of a damper film bearing assembly for supporting a rotatable shaft, the damper film bearing assembly having a bearing housing having a longitudinal opening passing therethrough for receiving the rotatable shaft. The bearing housing also has at least one radial recess formed in an outer surface thereof, the recess having a floor. The assembly further includes at least one support piston slideably disposed within the recess in the bearing housing, the support piston slideable within the recess radially toward and away from a central longitudinal axis of the rotatable shaft. At least one resilient element is disposed within the recess in the bearing housing between the floor of the recess and the support piston, the resilient element biasing the support piston away from the axis of the rotatable shaft.

In some embodiments, at least one resilient element comprises at least one disc spring. In some embodiments, at least one resilient element comprises a plurality of resilient elements. In certain of these embodiments, the plurality of resilient elements comprises a plurality of disc springs. In certain of these embodiments, at least some of the plurality of disc springs are arranged in parallel. In some embodiments, at least some of the plurality of disc springs are arranged in series.

In some embodiments, the at least one radial recess formed in the outer surface of the bearing housing comprises a plurality of radial recesses formed in the outer surface of the bearing housing, and the at least one support piston comprises a plurality of support pistons. In certain of these embodiments, the plurality of radial recesses are radially spaced around a circumference of the bearing housing. In certain embodiments, the plurality of radial recesses are spaced longitudinally along the bearing housing.

In some embodiments, the assembly further includes a preloading bolt causing the support piston to be moved toward the axis of the rotatable shaft and against the bias of the resilient element and held in that position. In certain of these embodiments, the preloading bolt comprises a threaded bolt cooperating with a threaded opening in the floor of the recess of the bearing housing. In some embodiments, the assembly further includes a backing washer disposed between the floor of the recess of the bearing housing and the resilient element.

In accordance with another embodiment of the present invention, a damper film bearing assembly for supporting a rotatable shaft includes a bearing housing having a longitudinal opening passing therethrough for receiving the rotatable shaft, and a bearing case having a longitudinal opening passing therethrough for receiving the bearing housing. An outer surface of the bearing housing and an inner surface of the bearing case define a space therebetween adapted to receive a damper oil therein. At least one of the outer surface of the bearing housing and the inner surface of the bearing case have at least one radial recess formed therein, the recess having a floor. At least one support piston is slideably disposed within the recess, the support piston slideable within the recess radially toward and away from the space defined between the outer surface of the bearing housing and the inner surface of the bearing case. At least one resilient element is disposed within the recess between the floor of the recess and the support piston, the resilient element biasing the support piston toward the space defined between the outer surface of the bearing housing and the inner surface of the bearing case.

In some embodiments, the bearing case comprises a generally continuous wall without radial holes passing completely therethrough. In some embodiments, the at least one resilient element comprises at least one disc spring. In some embodiments, the at least one resilient element comprises a plurality of resilient elements. In certain of these embodiments, the plurality of resilient elements comprises a plurality of disc springs. In certain of these embodiments, at least some of the plurality of disc springs are arranged in parallel. In certain embodiments, at least some of the plurality of disc springs are arranged in series.

In some embodiments, the at least one radial recess comprises a plurality of radial recesses, and the at least one support piston comprises a plurality of support pistons. In certain of these embodiments, the plurality of radial recesses are radially spaced. In certain embodiments, the plurality of radial recesses are spaced longitudinally.

In some embodiments, the assembly further includes a preloading bolt causing the support piston to be moved away from the space defined between the outer surface of the bearing housing and the inner surface of the bearing case and against the bias of the resilient element and held in that position. In certain of these embodiments, the preloading bolt comprises a threaded bolt cooperating with a threaded opening in the floor of the recess. In some embodiments, the assembly further includes a backing washer disposed between the floor of the recess and the resilient element.

The invention and its particular features and advantages will become more apparent from the following detailed description considered with reference to the accompanying drawings.

DETAILED DESCRIPTION OF AN EMBODIMENT OF THE INVENTION

Figure 1:
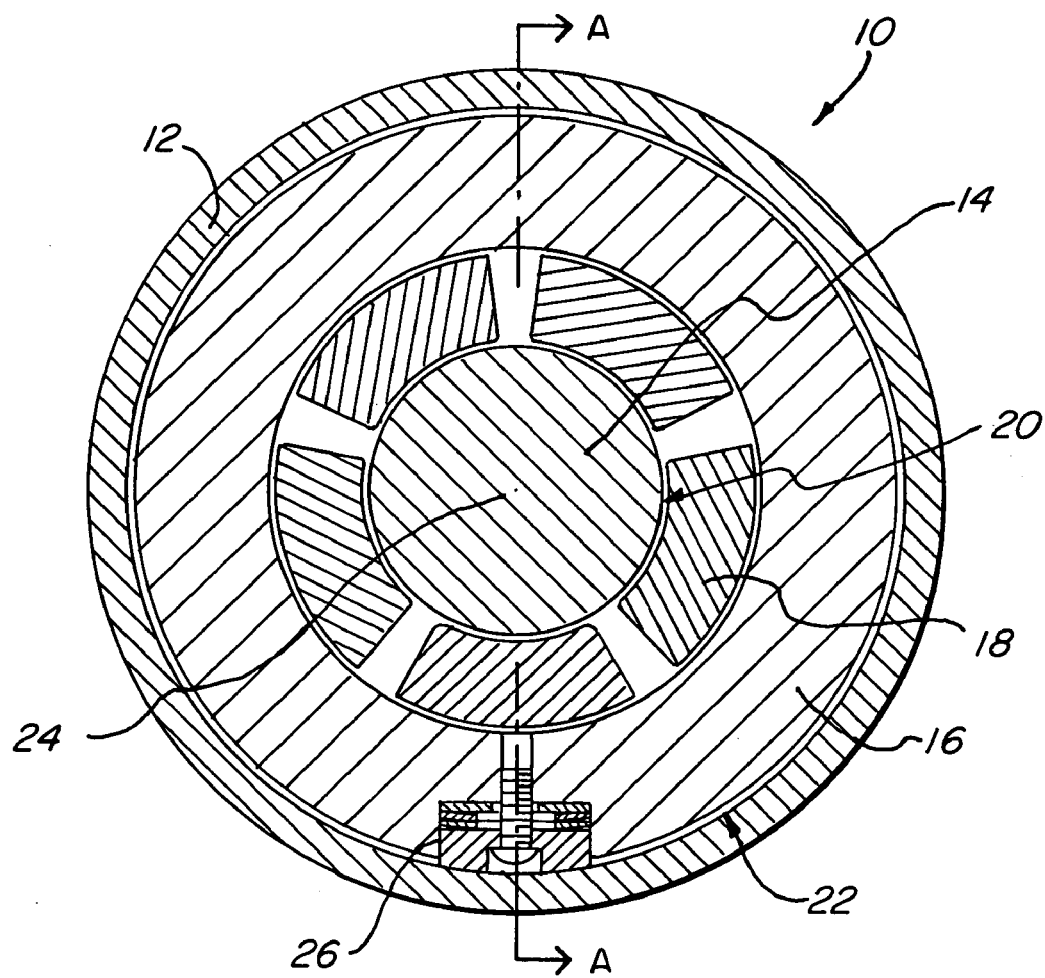
FIG. 1 is a partially cross-sectional view of a bearing assembly incorporating a centering device for squeeze film dampers in accordance with an embodiment of the present invention.

Referring first to FIG. 1, a bearing assembly 10 generally includes an adapter ring or bearing case 12, a rotating shaft or journal 14, a bearing housing 16, and a plurality of bearing tilting pads 18. Bearing tilting pads 18 are slightly radially spaced from journal 14 so as to create a space 20 for receiving a bearing oil film, provided generally for lubrication and friction reducing purposes. Bearing housing 16 and bearing case 12 are slightly radially spaced so as to create a space 22 for receiving a damper oil film. Bearing case 12, bearing housing 16, and bearing tilting pads 18 are disposed circumferentially about and concentrically with rotatable shaft 14. Unless otherwise stated, radial directions are directions which are radial to the central longitudinal axis 24, and longitudinal directions are parallel to the central longitudinal axis 24.

It should be noted that since the structure and operation of bearing assemblies as described in the preceding paragraph are well known in the art, a detailed description thereof is not provided herein. It should also be noted that while the disc spring centering devices in accordance with various embodiments of the present invention is depicted and described herein in connection with tilting pad journal bearings, they can be utilized with substantially any type of fluid film journal bearings such as fixed geometry sleeve bearings or hydrostatic bearings. They can also be used in conjunction with anti-friction or rolling element bearings.

Figure 2:
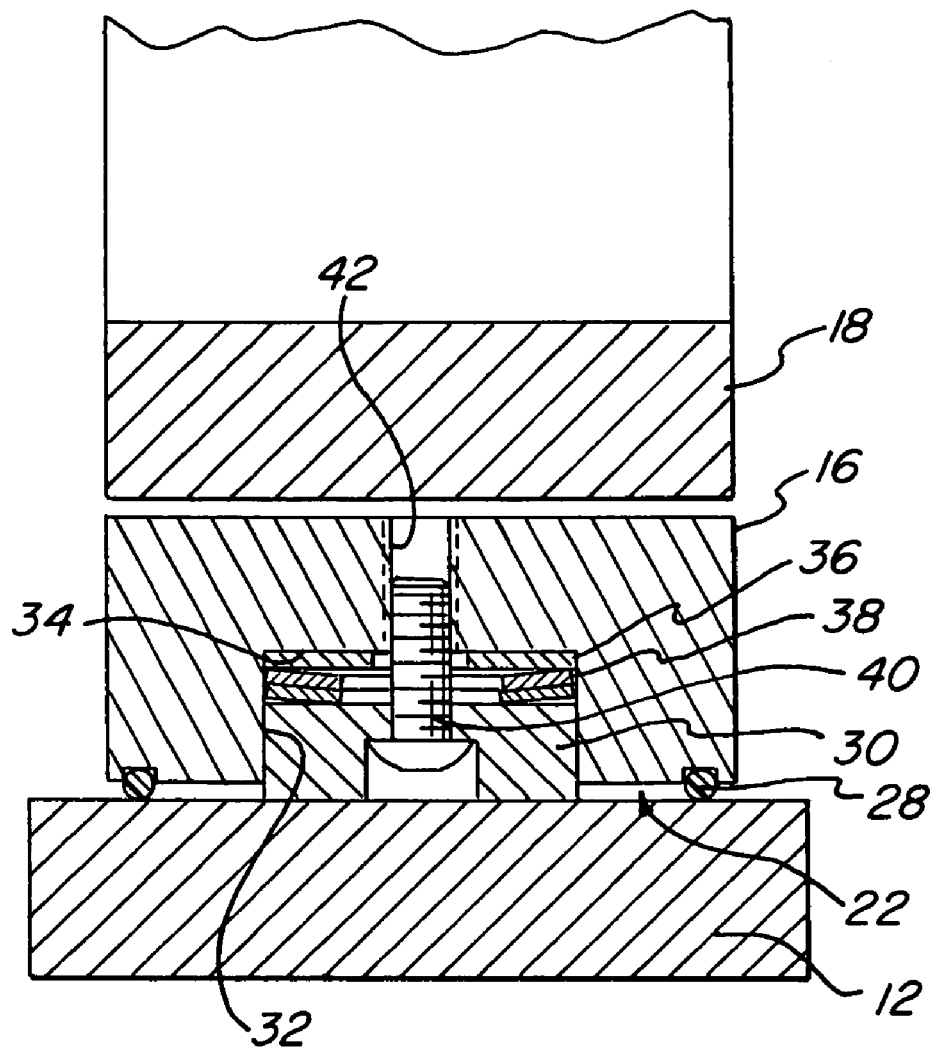
FIG. 2 is an enlarged, partially cross-sectional view, taken along line A—A of FIG. 1, showing in greater detail the centering device for squeeze film dampers.

Still referring to FIG. 1, as well as to FIG. 2, bearing assembly 10 also includes centering device 26, located between a pair of elastomer O-rings 28, for centering bearing housing 16 within the bearing case 12. Unlike prior art devices which rely upon O-rings to serve centering purposes, O-rings 28 of bearing assembly 10 are provided only to inhibit damper oil from leaking out from within space 22 provided therefore, not for providing a centering lo load-bearing function. Centering device 26, which is relatively simple in configuration and easy to design, includes a support piston 30, preferably formed from a hardened metal material, slideably disposed within a recess 32 provided in bearing housing 16. Preferably, support piston 30 and corresponding recess 32 are generally circular in cross-section, although such is not required.

Disposed between a floor 34 of recess 32 and support piston 30 is a backing washer 36 and at least one resilient element 38. Backing washer 36, which is preferably a flat washer formed from a hardened metal material, is provided between floor 34 of recess 32 and support piston 30 so as to protect floor 34 from damage by resilient element 38. A threaded preloading bolt 40 may cooperate with a threaded recess 42 formed in floor 34, and with support piston 30 via a hole therethrough such that preloading bolt 40 preloads resilient element 38. In this manner, resilient element 38 can be preloaded to offset the rotor weight so that when the rotor is placed in the bearing, the deflection of the resilient element 38 can be limited to half of the damper clearance, thereby centering the bearing housing 16.

Figure 3:
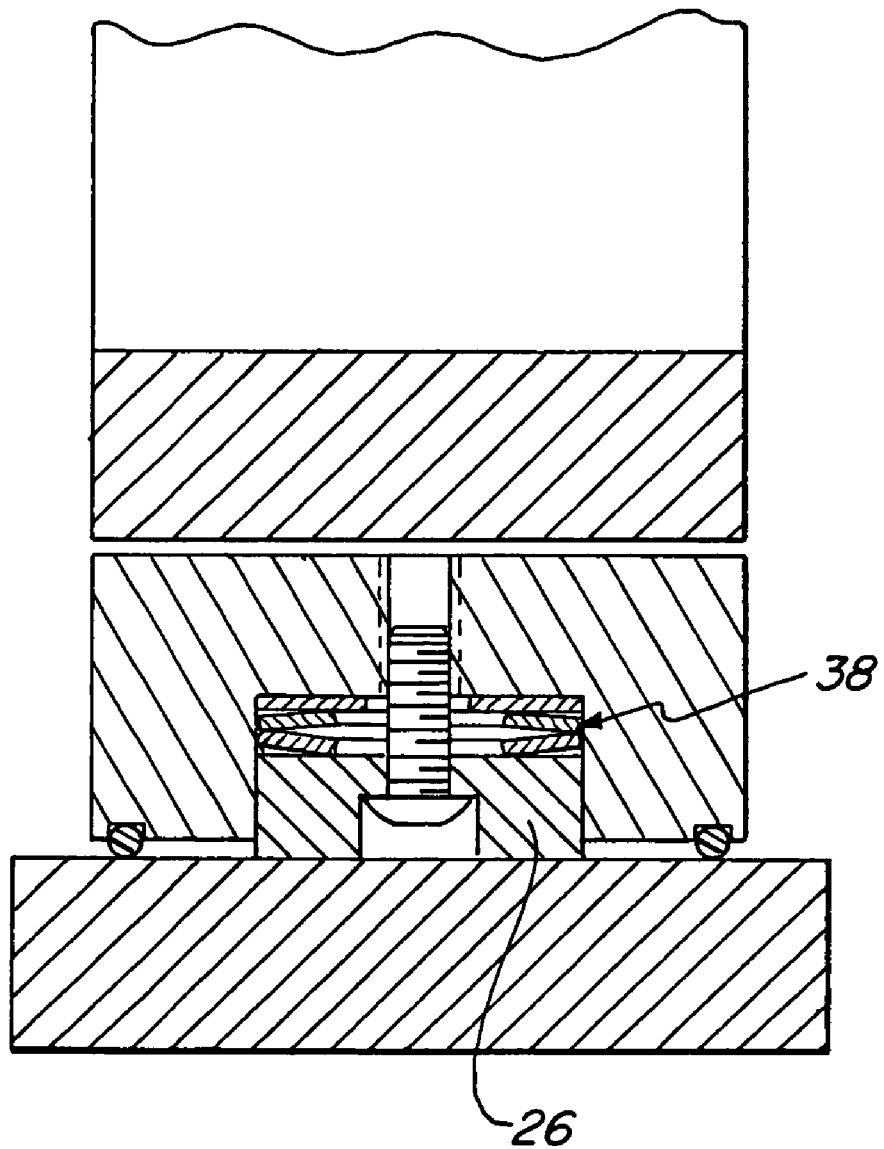
FIG. 3 is an enlarged, partially cross-sectional view showing in greater detail the centering device for squeeze film dampers of FIG. 1 shown with a different disc spring configuration.

Resilient element 38 preferably comprises at least one, and possibly more than one (as described more fully below), disc spring, or Belleville washer. As is known, the stiffness of disc springs is linear, which allows for the design of centering device 26 to be greatly simplified. When more than one resilient element 38 (i.e., disc spring) is employed, they can be stacked in parallel (as shown in FIG. 2) or in series (as shown in FIG. 3) to help tune the overall centering stiffness.

Figure 4:
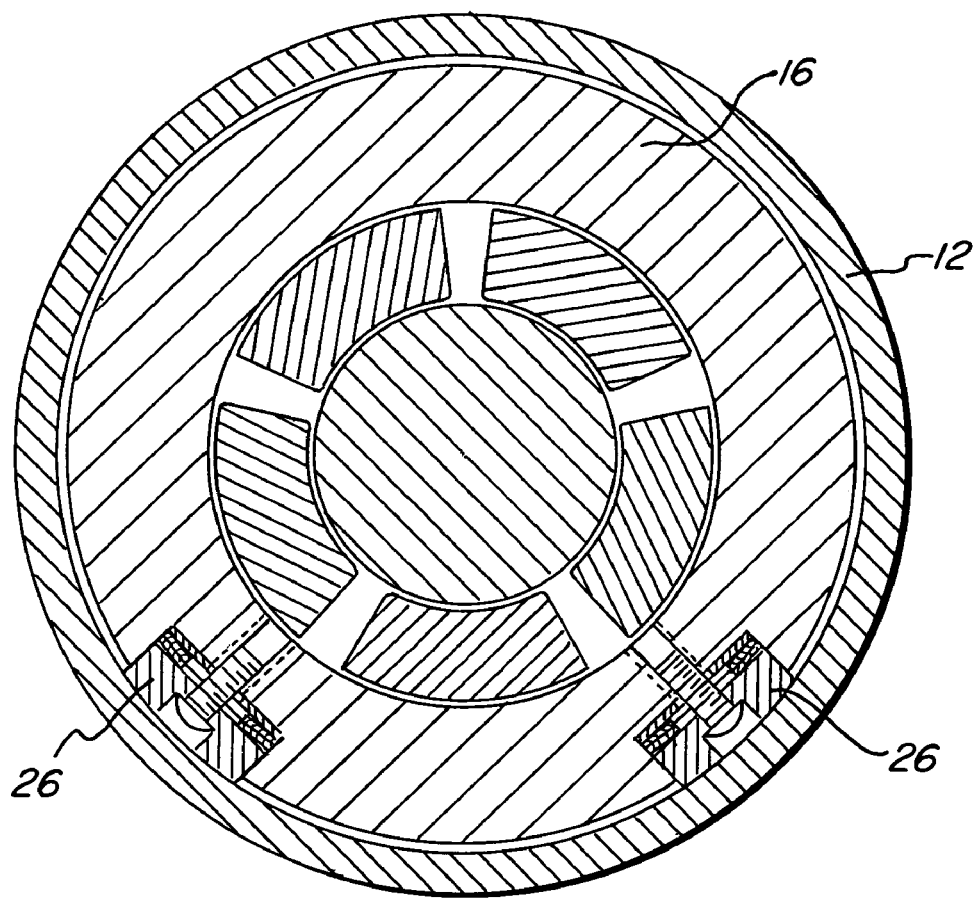
FIG. 4 is a partially cross-sectional view of the bearing assembly similar to that shown in FIG. 1, but incorporating two centering devices for squeeze film dampers in accordance with an embodiment of the present invention.
Figure 5:
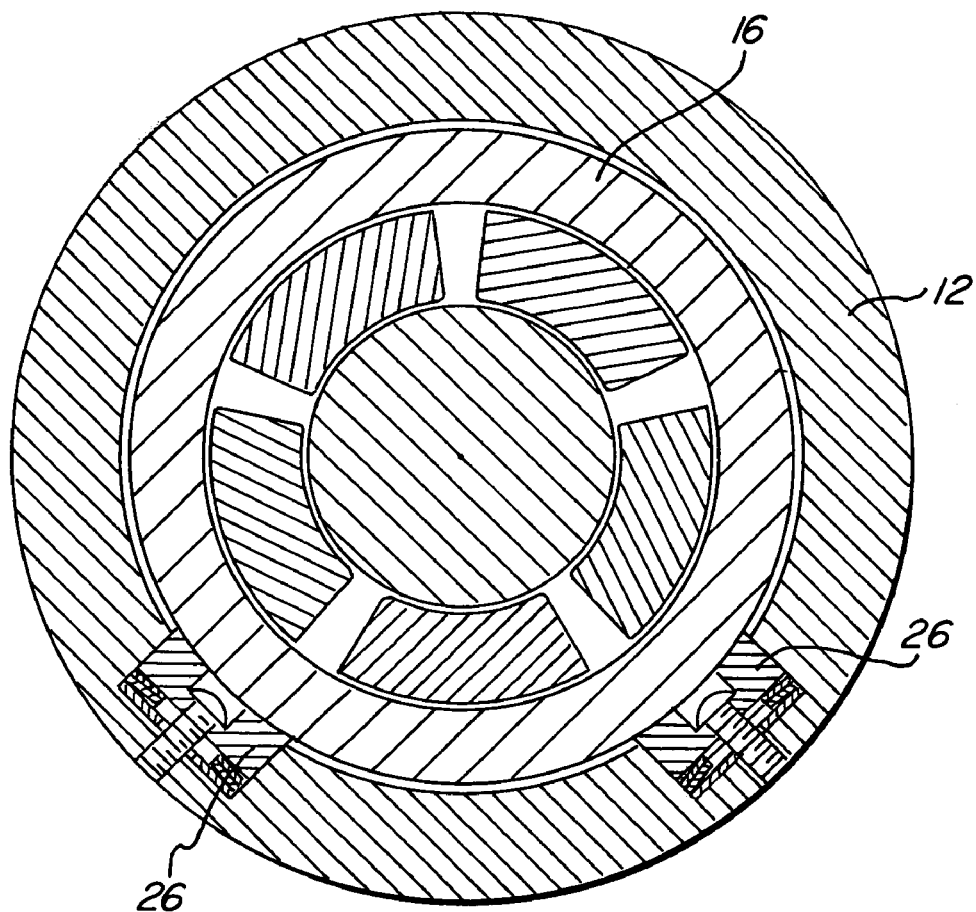
FIG. 5 is a partially cross-sectional view of the bearing assembly similar to that shown in FIGS. 1 and 5, but incorporating two centering devices for squeeze film dampers in accordance with an embodiment of the present invention which are formed in the bearing case rather than in the bearing housing.
Figure 6:
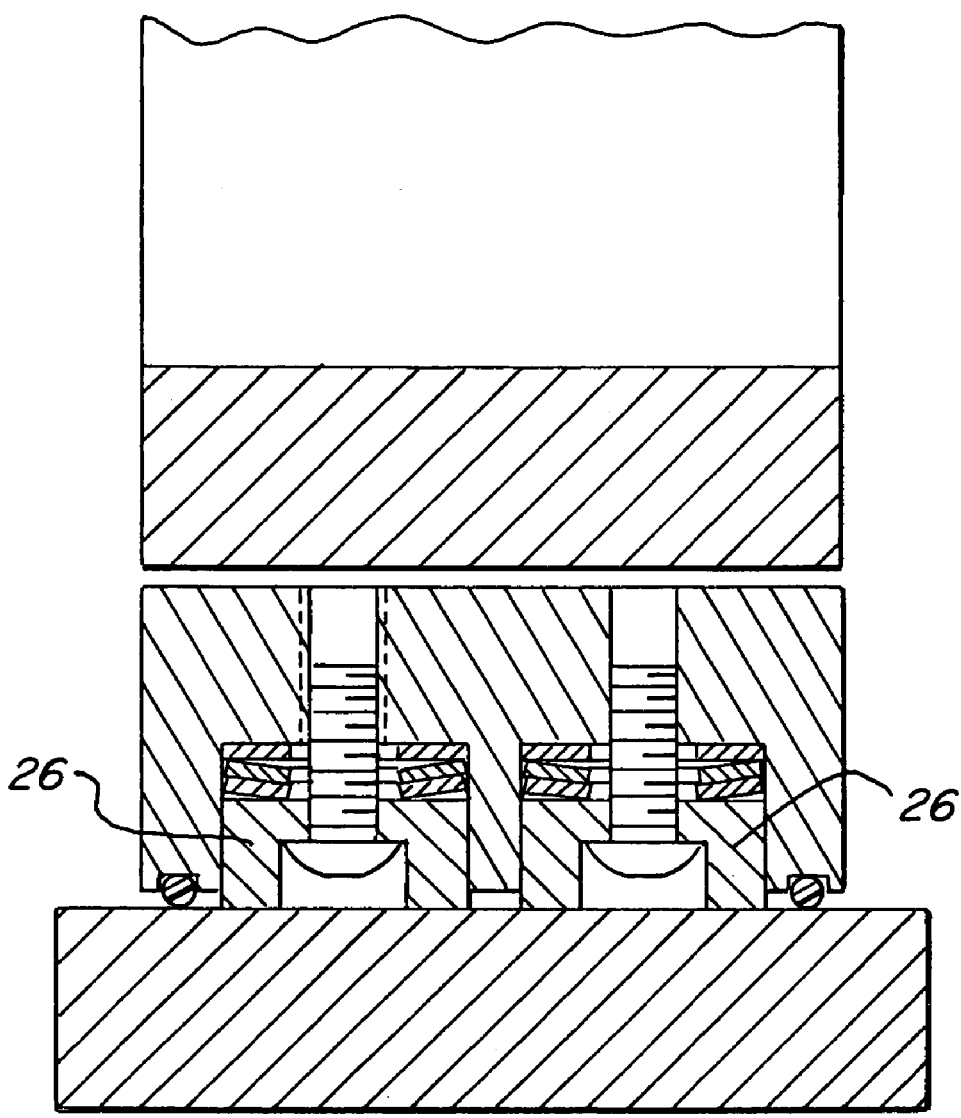
FIG. 6 is an enlarged, partially cross-sectional view showing an embodiment of the bearing assembly shown in FIG. 1, taken along line A—A of FIG. 1, in which the bearing assembly includes two centering devices for squeeze film dampers in accordance with an embodiment of the present invention arranged side by side axially.

Centering devices 26 may be placed in compression in any circumferential location around the bearing housing 16 outside diameter (as shown in FIG. 4) or around the bearing case 12 inside diameter (as shown in FIG. 5). For example, one centering device 26 may be located at bottom dead center (as shown in FIG. 1) or two centering devices 26 may be located at 45° from bottom dead center (as shown in FIGS. 4 and 5). In the latter configuration, the two centering devices 26 also offer horizontal support to the bearing housing 16. Two or more centering devices 26 may also be placed in parallel, side-by-side axially (as shown in FIG. 6), at any circumferential location either in the bearing housing 16 or in the bearing case 12.

Figure 7B:
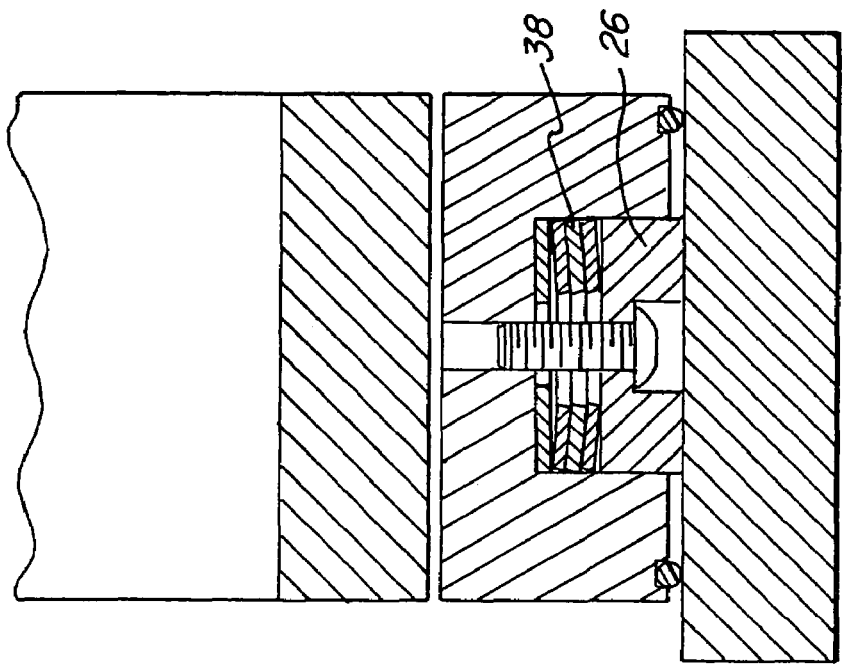
FIGS. 7A and 7B are enlarged, partially cross-sectional views showing in greater detail the centering device for squeeze film dampers of FIG. 1 shown with different disc spring configurations.
Figure 7A:
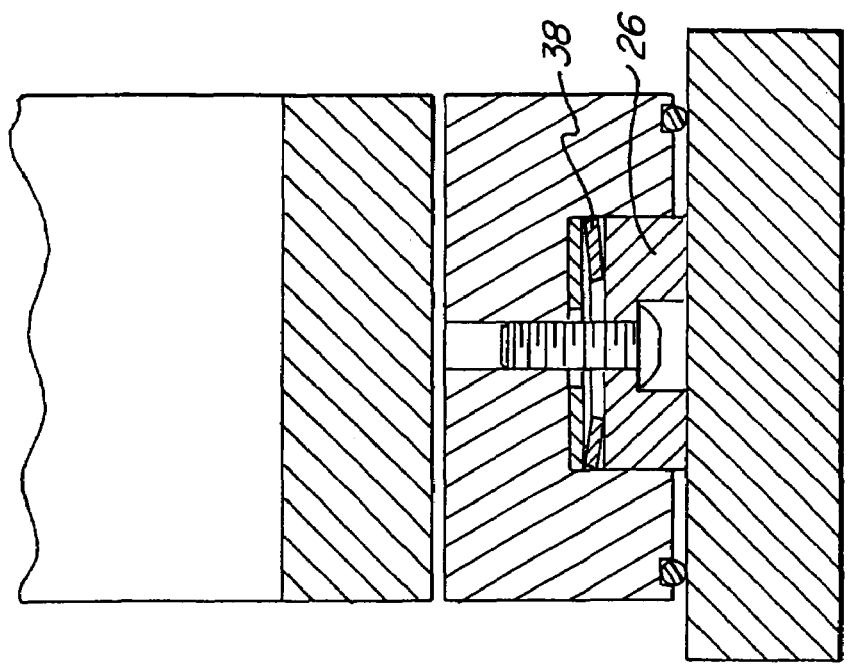

For any of the aforementioned configurations, single (shown in FIG. 7A) or multiple (shown in FIG. 7B) resilient elements 38 (i.e., disc springs) may be used. When used in multiples, the resilient elements (i.e., disc springs) may be stacked entirely in parallel (as shown in FIGS. 2 and 7B), entirely in series (as shown in FIG. 3), or in any combination thereof.

As noted above, and referring again to FIG. 5 in particular, although it is most desirable for centering devices 26 to be located within recesses formed within bearing housing 16 (so as to avoid many of the problems associated with the device disclosed in the Kuzdzal patent), there may be instances when such is not possible. For example, as shown in FIG. 5, the bearing housing 16 may not be thick enough to allow for such. In such cases, there may be no choice but to locate centering devices 26 within recesses formed within bearing case 12 (or within the adapter ring if one is provided). It should be understood by those skilled in that art that what is meant by "adapter ring" is a member that is provided in situations where the interface between the existing bearing housing 16 and bearing case 12 is not conducive to a damper. In these cases, an adapter ring may be built which matches up with the bearing case 12 at its outside diameter while providing the damper surface at its inside diameter. In such case, centering devices 26 can be located in the adapter ring (similar to the way centering devices 26 are located in bearing case 12 in FIG. 5) and both the adapter ring and bearing housing 16 can be rolled into the existing bearing case 12.

While the configuration shown in FIG. 5 may not avoid some of the disadvantages of the Kuzdzal reference, it does still provide significant advantages thereover, one of such advantages being that while modification of the bearing case 12 would be required, modification of the bearing housing 16 would not. In the Kuzdzal device, modification is required to both the bearing housing and the bearing case. Another advantage is that even using the configuration shown in FIG. 5, the resilient elements 28 exert compressive forces directly onto the support piston 30. In the Kuzdzal device, springs exert forces on the bearing housing via tension through the bolts, thereby rendering the device more prone to failure, particularly after extended use. A further advantage of the configuration shown in FIG. 5 over the Kuzdzal device is that there is no need to disengage the disc spring bolts in order to remove the bearing from the bearing case, which disengagement would cause the proper preload setting to be lost.

With the inventive design as described above in connection with FIGS. 1–4, 7A and 7B, the centering device 26 is incorporated in the bearing housing 16 which the bearing supplier typically manufactures. Thus, for retrofits or for new machinery, no changes and no machining are necessary on the bearing case 12. The bearing with damper and centering device 26 simply directly replaces the original bearing, i.e., roll out the old bearing and roll in a damper bearing incorporating one or more centering devices 26 according to the present invention. For retrofits, this minimizes expensive down time.

Moreover, with centering device 26 incorporated into the bearing housing 16, it is possible to set and check the preloading bolts 40 for proper preload without the large, heavy bearing case 12, again facilitating the "roll out/roll in" retrofit (no need to remove and send the bearing case 12 to the bearing manufacturer). Furthermore, when the centering device 26 is contained within the bearing housing 16, the bearing can be removed from the bearing case 12 with the centering device assembled in the bearing housing 16, retaining all parts and, more importantly, maintaining the proper preload.

The present invention, therefore, provides a centering device for squeeze film dampers which is relatively easy, and not labor intensive, to design and adapt to the configurations of particular bearings, which is not prone to losing its effectiveness over time, which provides sufficient stiffness to counteract large rotor weight, which is not cumbersome and does not require machining modifications to the bearing case, and which does not require that the pre-load be set upon assembly and re-set upon each re-assembly.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A damper film bearing assembly for supporting a rotatable shaft, said damper film bearing assembly comprising:
   a bearing housing having a longitudinal opening passing therethrough for receiving the rotatable shaft, said bearing housing also having at least one radial recess formed in an outer surface thereof, the recess having a floor;
   at least one support piston slideably disposed within the recess in said bearing housing, said support piston slideable within the recess radially toward and away from a central longitudinal axis of the rotatable shaft; and
   at least one resilient element disposed within the recess in said bearing housing between the floor of the recess and said support piston, said resilient element biasing said support piston away from the axis of the rotatable shaft.

2. The damper film bearing of claim 1 wherein said at least one resilient element comprises at least one disc spring.

3. The damper film bearing assembly of claim 1 wherein said at least one resilient element comprises a plurality of resilient elements.

4. The damper film bearing of claim 3 wherein said plurality of resilient elements comprises a plurality of disc springs.

5. The damper film bearing of claim 4 wherein at least some of said plurality of disc springs are arranged in parallel.

6. The damper film bearing of claim 4 wherein at least some of said plurality of disc springs are arranged in series.

7. The damper film bearing of claim 1 wherein said at least one radial recess formed in the outer surface of said bearing housing comprises a plurality of radial recesses formed in the outer surface of said bearing housing, and wherein said at least one support piston comprises a plurality of support pistons.

8. The damper film bearing of claim 7 wherein the plurality of radial recesses are radially spaced around a circumference of said bearing housing.

9. The damper film bearing of claim 7 wherein the plurality of radial recesses are spaced longitudinally along said bearing housing.

10. The damper film bearing of claim 1 further comprising a preloading bolt causing said support piston to be moved toward the axis of the rotatable shaft and against the bias of said resilient element and held in that position.

11. The damper film bearing of claim 10 wherein said preloading bolt comprises a threaded bolt cooperating with a threaded opening in the floor of the recess of said bearing housing.

12. The damper film bearing of claim 1 further comprising a backing washer disposed between the floor of the recess of said bearing housing and said resilient element.

13. A damper film bearing assembly for supporting a rotatable shaft, said damper film bearing assembly comprising:
   a bearing housing having a longitudinal opening passing therethrough for receiving the rotatable shaft;
   a bearing case having a longitudinal opening passing therethrough for receiving said bearing housing, an outer surface of said bearing housing and an inner surface of said bearing case defining a space therebetween adapted to receive a damper oil therein;
   wherein at least one of the outer surface of said bearing housing and the inner surface of said bearing case have at least one radial recess formed therein, the recess having a floor;
   at least one support piston slideably disposed within the recess, said support piston slideable within the recess radially toward and away from the space defined between the outer surface of said bearing housing and the inner surface of said bearing case; and
   at least one resilient element disposed within the recess between the floor of the recess and said support piston, said resilient element biasing said support piston toward the space defined between the outer surface of said bearing housing and the inner surface of said bearing case.

14. The damper film bearing assembly of claim 13 wherein said bearing case comprises a generally continuous wall without radial holes passing completely therethrough.

15. The damper film bearing of claim 13 wherein said at least one resilient element comprises at least one disc spring.

16. The damper film bearing assembly of claim 13 wherein said at least one resilient element comprises a plurality of resilient elements.

17. The damper film bearing of claim 16 wherein said plurality of resilient elements comprises a plurality of disc springs.

18. The damper film bearing of claim 17 wherein at least some of said plurality of disc springs are arranged in parallel.

19. The damper film bearing of claim 17 wherein at least some of said plurality of disc springs are arranged in series.

20. The damper film bearing of claim 13 wherein said at least one radial recess comprises a plurality of radial recesses, and wherein said at least one support piston comprises a plurality of support pistons.

21. The damper film bearing of claim 20 wherein the plurality of radial recesses are radially spaced.

22. The damper film bearing of claim 20 wherein the plurality of radial recesses are spaced longitudinally.

23. The damper film bearing of claim 13 further comprising a preloading bolt causing said support piston to be moved away from the space defined between the outer surface of said bearing housing and the inner surface of said bearing case and against the bias of said resilient element and held in that position.

24. The damper film bearing of claim 23 wherein said preloading bolt comprises a threaded bolt cooperating with a threaded opening in the floor of the recess.

25. The damper film bearing of claim 13 further comprising a backing washer disposed between the floor of the recess and said resilient element.

* * * * *